United States Patent [19]

Hasha

[11] Patent Number: 4,667,389

[45] Date of Patent: May 26, 1987

[54] APPARATUS AND METHOD FOR CONNECTING TWO THREADED MEMBERS

[76] Inventor: Brian B. Hasha, 17211 Ash Butte, Houston, Tex. 77090

[21] Appl. No.: 707,447

[22] Filed: Mar. 1, 1985

[51] Int. Cl.⁴ .................. B23Q 17/00; G01L 3/02; B25B 23/14

[52] U.S. Cl. .................. 29/407; 73/862.29; 73/862.24

[58] Field of Search .............. 73/761, 862.29, 862.24; 29/407

[56] References Cited

U.S. PATENT DOCUMENTS

| | | | |
|---|---|---|---|
| 2,216,563 | 10/1940 | Cartier | 73/862.29 |
| 3,096,643 | 7/1963 | Essenmacher | 73/761 |
| 3,229,510 | 1/1966 | Bodemeijer | 73/862.29 |
| 4,176,436 | 12/1979 | McCombs et al. | 73/862.23 |
| 4,259,869 | 4/1981 | Carlin | 73/761 |
| 4,416,147 | 11/1983 | Hasha | 73/49.6 |
| 4,502,323 | 3/1985 | Watase et al. | 73/49.6 |

*Primary Examiner*—Howard N. Goldberg
*Assistant Examiner*—Steven Nichols
*Attorney, Agent, or Firm*—Vinson & Elkins

[57] ABSTRACT

An apparatus (10) and method is disclosed for connecting a pipe (12) and a test plug (28) comprising a carriage assembly (14) positioned on a base (16) that is capable of horizontal and vertical movement relative to base (16). Opposed pairs of fluid operated cylinders (56) are provided on opposite sides of carriage assembly (14) that support carriage assembly (14) on base (16) for relative vertical movement. A fluid control system associated with the cylinders (56) is selectively operated in two modes, an open pressure balanced float mode to permit relatively free lateral movement between the pipe (12) and test plug (28) for axial alignment, and a closed torque mode provided during make-up, for immediately detecting from an increase in fluid pressure in the cylinders (56) any excessive torque or misalignment of test plug (28) and pipe (12) resulting in a vertical deflection of the carriage assembly (14) thereby indicating when thread damage may be occurring. A change in fluid pressure in cylinders (56) which results from the vertical deflection of carriage assembly (14) is immediately registered or monitored by pressure monitors (118) to permit an operator to monitor the torque occurring during make-up.

22 Claims, 16 Drawing Figures

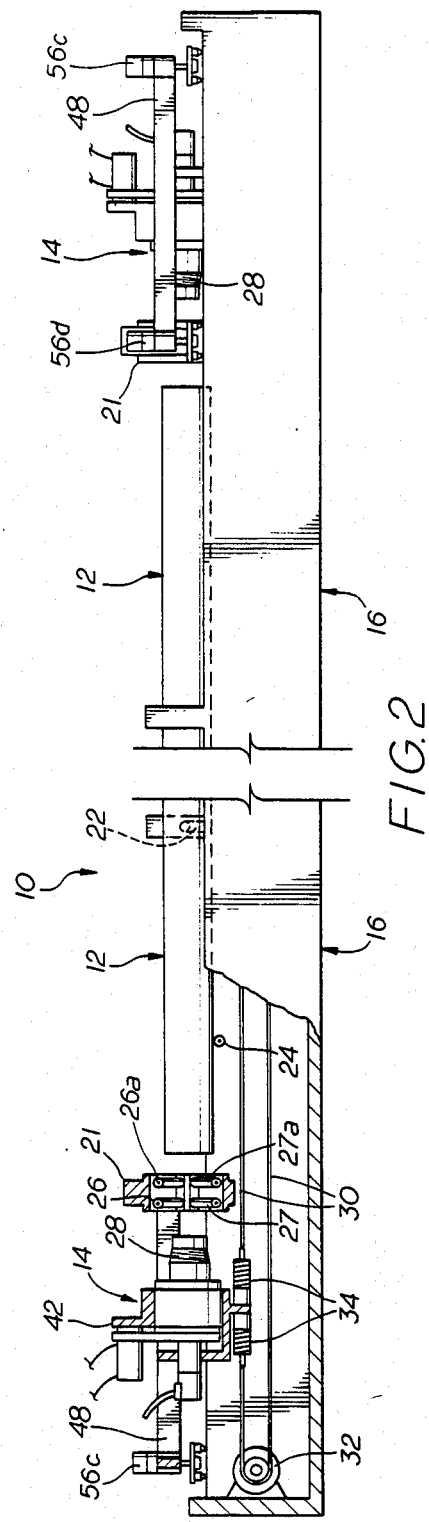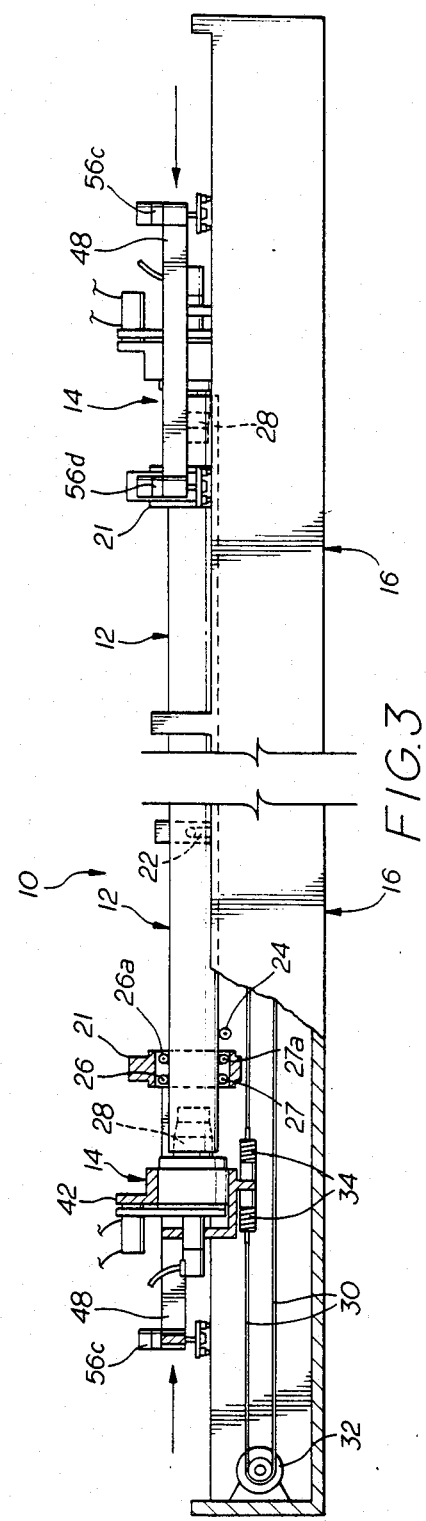

APPARATUS AND METHOD FOR CONNECTING TWO THREADED MEMBERS

This invention relates to an apparatus and method for connecting two threaded members, such as oil and gas pipe or casing, and particularly such an apparatus and method for accurately and instantaneously detecting any misalignment of the members, or excessive torque resulting from make-up of the members.

BACKGROUND OF THE INVENTION

Long strings of pipe are often used to bring up oil and gas deposits after a well has been drilled. These pipe strings consist of a number of pipe sections which have external threads at one end and internal threads at the other end. The pipe sections are screwed together at the well to form pipe strings. It is important that the threaded connections of the pipe sections form a perfect connection so that no leakage occurs at the joints. In order to assure that the threaded connections are undamaged and that a good connection can be formed, each pipe section is rack tested prior to use at the well. This testing also insures adequate pipe body strength. During a rack test, the pipe sections are placed on a rack, the ends are sealed with test plugs, and the pipe subjected to hydrostatic pressure to detect leakage at the threaded joints.

In spite of the fact that rack testing is very important, a number of problems still exist in this area, especially when a hydraulically operated machine is used to make up the test plugs with the ends of the pipe. Occasionally piping becomes bent. This makes it difficult to align the test plug with the pipe end. If the test plug and the pipe end are not properly aligned during the make-up, cross-threading or side loading can occur.

In addition, debris or foreign matter may become lodged between the threads during make-up resulting in damage to the threads.

In attempting to bring a test plug into more perfect alignment with a pipe end, prior art rack testers have utilized a test plug which is mounted onto a unit with springs or air bags which allows the test plug to undergo limited movement relative to the pipe and thus move into vertical alignment with the pipe end prior to make-up. Although mounting the test plug in this manner decreases the probability that thread damage will occur, the use of springs or air bags has certain drawbacks. Where such springs or air bags are used, the components are limited to only one fixed resistance. This controls the amount of movement which the test plug may undergo. Therefore, in order to vary the resistances and alter the height to which the test plug may move, in accordance with the condition of the pipe end or the size or weight of the pipe, the mechanical springs must be changed out in order to change the effective spring rate. Similary, the air pressure must be increased or decreased in the air bags.

Further, the heavier the test plug assembly is, the higher the effective spring rate or fixed resistance must be. Higher resistances can overload pipe threads and cause thread damage if the test plug deflects in order to align with the pipe. On the other hand, lower resistances may not be sufficient to withstand the torques that are applied to the pipe end during the threading of the test plug into the pipe end.

In order to compensate for this deficiency, several prior art techniques have been developed which involve apparatus or methods for monitoring the making up of threaded tubular joints in order to detect and control the amount of torque applied to the joint. Using these techniques, one can detect and control the excessive torque which can damage threads. One such apparatus and method is shown in U.S. Pat. No. 3,096,643, which discloses a combined screw torque and tension measuring or torque detecting device for threaded fasteners. This device is functionally adapted to rapid repetitive testing of small diameter elements and would not be adaptable for use with a pipe testing apparatus for large diameter pipe and casing. U.S. Pat. No. 4,176,436 also discloses a control means for an apparatus for assembling threaded members such as pipe sections to form a pressure sealed joint. The apparatus produces a warning of a bad joint upon the measurement of a predetermined torque prior to reaching a minimum number of turns and vice versa. Another patent, U.S. Pat. No. 4,259,896, discloses an apparatus and method for inspection and control of threaded joint tightening processes by registering during the main part of the tightening process the momentary values of the torque delivered to the joint and the angular displacement of the joint. This is accomplished by comparing these values in a control unit with limit values fo a narrow check range so that a wider control range damage to the threads may be prevented.

The major disadvantage of these prior art systems is that it is not possible to detect slight misalignments of the test plug with the pipe end and/or very small changes in torque. As a result, threads may be damaged before the operator is alerted to the fact that misalignment of excessive torque has occurred. In order to solve these problems the apparatus of the present invention has a variable spring rate which permits proper alignment of the threaded members and which is capable of determining when thread damage is occurring during make-up by detecting misalignment of the test plug with the pipe end and/or very small changes in torque.

SUMMARY OF THE INVENTION

The apparatus and method of the present invention solve these problems by detecting misalignment of the test plug and pipe end and by continuously and instantaneously measuring torque during make-up of the connection. A highly sensitive fluid pressure control system is provided which is selectively moved between a float mode consisting of an open large volume system for initial axial alignment of the tubular members prior to make-up, and a torque mode consisting of a closed small volume system during make-up. This system immediately detects any excessive torque or misalignment which may cause thread damage.

The pipe testing structure utilized with the present apparatus includes a longitudinally extending base on which the pipe to be tested is placed. During testing, the two ends of the pipe are sealed with rotatable test plugs through which hydrostatic test fluid can be introduced.

A carriage assembly is mounted for longitudinal movement along a pair of parallel tracks on the fixed base. A test plug is carried by the carriage assembly and a plurality of fluid pressure cylinders (pneumatically operated in the preferred embodiment) are positioned between the fixed base and carriage assembly. The cylinders support the carriage assembly on the base and permit relative vertical movement of the carriage assembly thereby allowing the test plug to vertically align the pipe end. In addition, a fluid pressure control system which includes the associated fluid pressure cylinders permits an accurate and instantaneous detection of vertical deflection of the carriage assembly from a measuring of the fluid pressure in the cylinders during make-up or testing of the connection. The carriage assembly also has inclined pairs of associated upper and lower guide rollers which engaged the outer surface of the pipe and brings the test plug into alignment with the pipe end upon lateral movement of the carriage assembly relative to the fixed base.

OBJECTS OF THE INVENTION

An object of the invention is to provide an apparatus and method which permit accurate alignment of two threaded members and assure proper subsequent make-up or threading of the members. The invention is particularly applicable to aligning and threading a test plug into oil and gas pipe or casing, or to threading sections of such pipe or casing into each other.

Another object of the invention is to provide a sensitive means for detecting any misalignment of tow threaded members as they are being connected by measuring changes in fluid pressure resulting from a vertical movement of a support for the threaded member.

A further object of the invention is to provide a carriage assembly in which a test plug and guide are mounted so that the test plug moves automatically into proper axial alignment with the pipe and to provide a control system which measures through changes in fluid pressure and vertical deflection of the carriage assembly as the make-up of the threads proceeds.

Another important object of the invention is to provide a very sensitive fluid control system, either pneumatic or hydraulic, which permits the entire carriage assembly and thus the test plug to function in two modes. The first mode is a free floating balanced pressure mode which allows the test plug to float into vertical alignment with the pipe end. The second mode is a torque or closed fluid pressure mode which permits the control system associated with the carriage assembly to measure the changes in fluid pressure resulting from very slight vertical deflections in the carriage assembly including deflections due to very slight increases in torque experienced by the threaded connection during make-up.

BRIEF DESCRIPTION OF THE DRAWINGS

FIG. 2 is a view partly in section and partly in side elevation of the entire pipe testing apparatus showing a pair of carriage assemblies to which the test plugs are secured, the carriage assemblies and test plugs spaced from the pipe in a retracted position prior to testing.

FIG. 3 is a view similar to FIG. 2 illustrating the test plugs on the carriage assemblies engaged with the pipe being tested.

Figure 14:
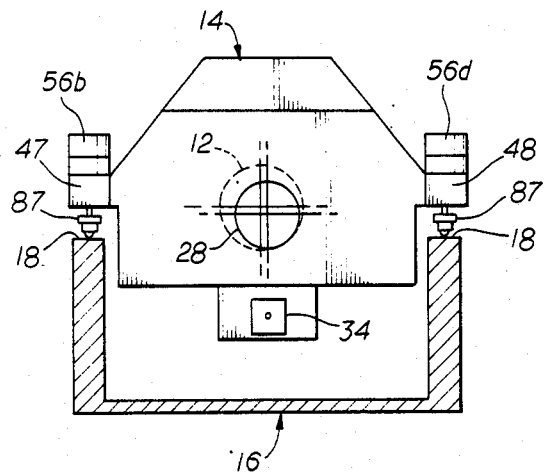
FIG. 14 is a cross sectional view of a carriage assembly and the pipe testing apparatus showing misalignment of the test plug and the pipe end prior to make-up.

FIG. . 15 is a cross sectional view similar to FIG. 14 but showing perfect alignment of the test plug and the pipe end prior to make-up.

FIG. . 16 is a cross sectional view similar to FIGS. and 14 and 15 but showing torque on the test plug and the pipe end during make-up resulting in a deflection of the carriage assembly.

DESCRIPTION OF THE PREFERRED EMBODIMENT

Figure 1:
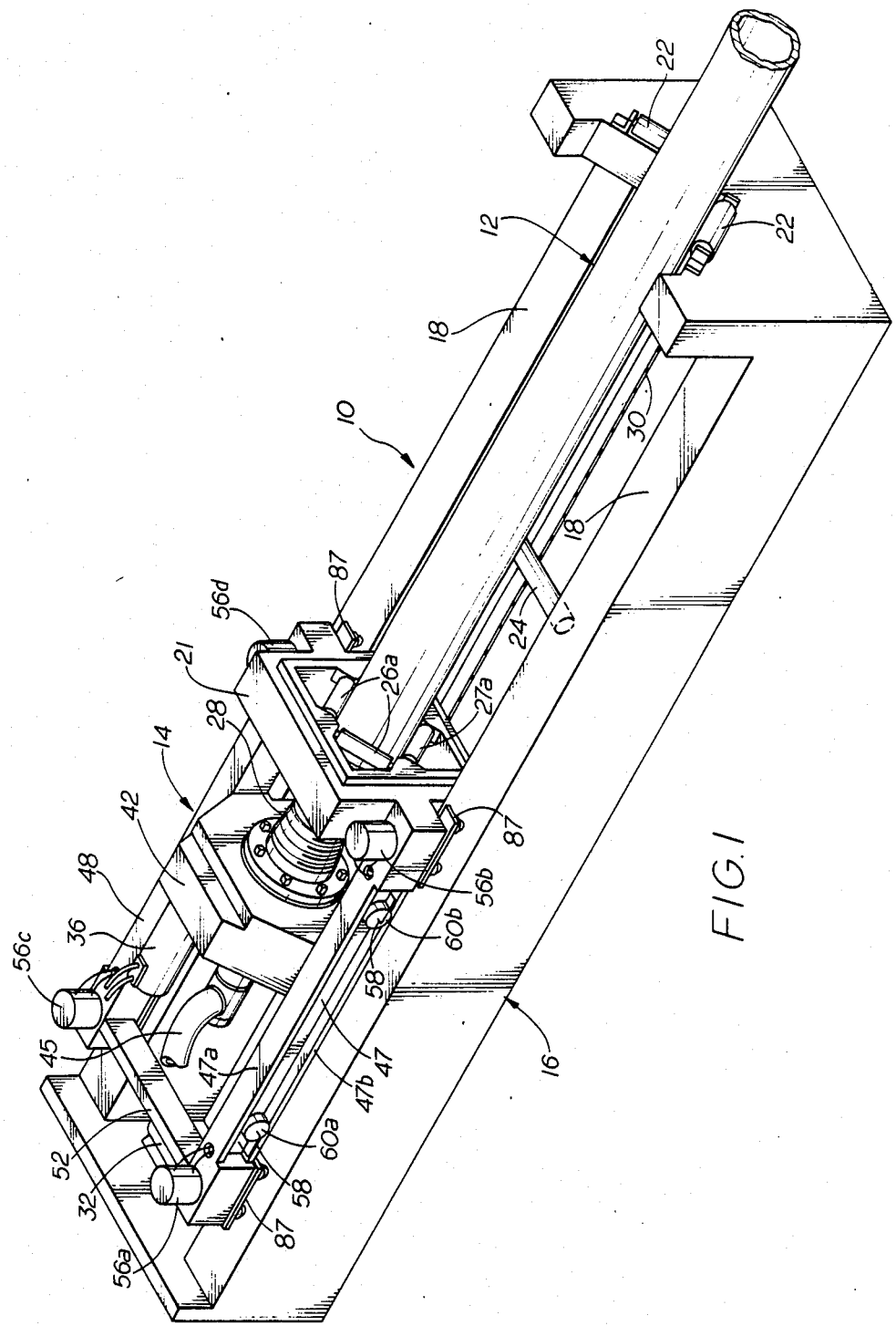
FIG. 1 is an isometric view of one half of a pipe testing apparatus constructed in accordance with the invention showing a single carriage assembly with the pipe end disengaged from the test plug prior to testing.

FIG. 1 shows a pipe testing apparatus generally denoted by numeral 10 which is used in the oil and gas industry to test the threaded connections of pipe 12 for damage. Apparatus 10 includes a carriage assembly generally denoted by numeral 14 which is mounted for horizontal and vertical movements on a longitudinal base generally denoted by numeral 16. Base 16 can be varied in length to accommodate different sizes of pipe 12. Base 16 is generally U-shaped to form a cradle having two parallel tracks 18 on which carriage assembly 14 is mounted for relative movement. Pipe 12 which is to be tested rests upon and within base 16 and is supported and held in a predetermined position thereon. base 16 has a pair of supporting rollers 22 adjacent one end thereof beneath pipe 12 and a single roller 24 (shown in FIG. 1, FIG. 2 and FIG. 3) supporting pipe 12 adjacent to carriage assembly 14. A box-shaped guide 21 on carriage assembly 14 has two spaced pairs of upper rollers 26 and 26a as shown in FIG. 1, FIG. 2 and FIG. 3, and two spaced pairs of lower rollers 27 and 27a carried by guide 21 in the same vertical plane as respective upper roller 26 and 26a. Initial axial alignment of the end of pipe 12 is provided by rollers 26, 26a, 27, and 27a as carriage assembly 14 is moved into engagement with pipe 12 as shown in FIG. 3. During testing of a joint or connection, pipe 12 is threadedly connected to two test plugs 28, one at each end of pipe 12 (as depicted in FIG. 3) into which hydrostatic test fluid is introduced. Each test plug 28 performs the same function. Some test plugs 28, however, may have female threads while others may have male threads. For the purpose of illustration only one test plug 28 will be described in detail. Test plug 28 is mounted on carriage assembly 14, which allows test plug 28 to float into vertical alignment with pipe 12.

Figure 4:
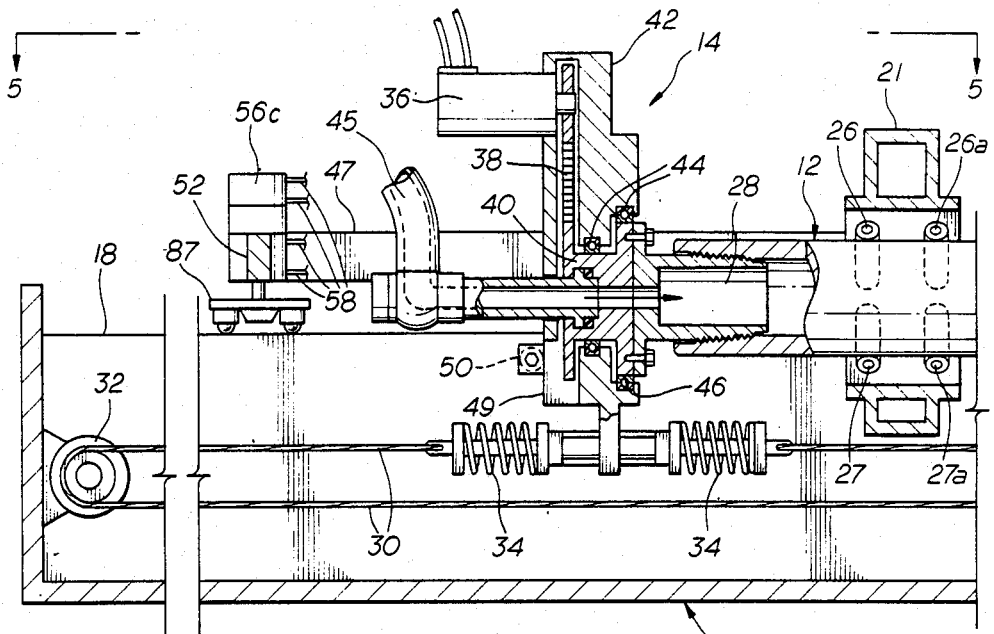
FIG. 4 is a partial sectional view of a carriage assembly illustrating the test plug engaged with the internal threads of the pipe.
Figure 5:
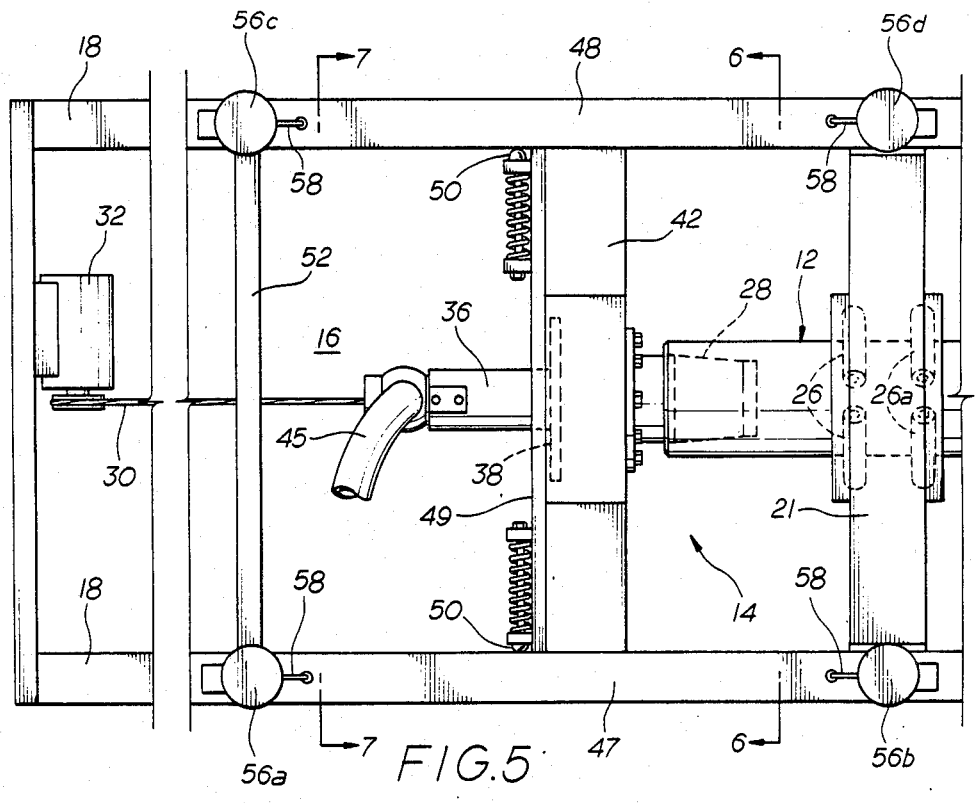
FIG. 5 is a plan view of the carriage assembly shown in FIG. 4 looking generally along line 5—5 of FIG. 4.
Figure 7:
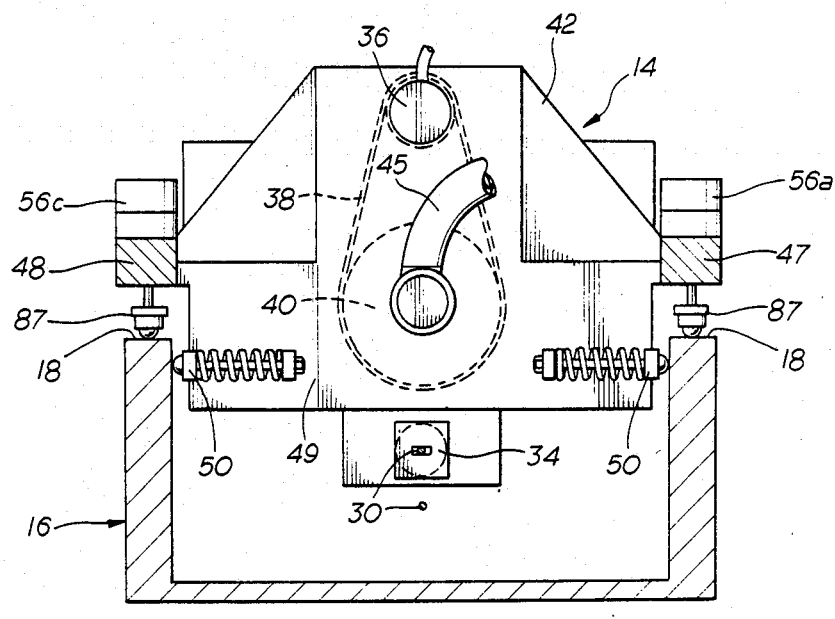
FIG. 7 is a transverse sectional view of the carriage assembly taken on line 7—7 of FIG. 5.

Test plug 28 is capable of being moved towards pipe 12 and stabbed into pipe 12, then rotated to form a threaded connection with the end of the pipe. An endless cable 30 driven by a hydraulic motor 32 moves the carriage assembly 14 and the test plug 28 towards and away from the pipe 12. Springs 34 on cable 30 act as shock absorbers and cushion the shock when test plug 28 is stabbed into the end of the pipe 12. As shown in FIG. 4, FIG. 5, and FIG. 7 hydraulic motor 36 drives rotating member 40 and test plug 28. Test plug 28 is secured to rotating member 40 through suitable sprockets connected by a chain belt 38 housed within housing 42. A plurality of ball bearing 44 and ball bearing raceways 46 between rotating member 40 and housing 42 permit free rotation therebetween. For test purposes, hydrostatic test fluid at predetermined fluid pressure is introduced through flexible tubing 45, rotating member 40, and test plug 28, into pipe 12, in order to determine if any leakage is occurring in the threaded connection or the associated pipe.

FIG. 2 shows the test plugs 28 mounted on the carriage assemblies 14 in the open retracted position, with the test plugs 28 separated from the ends of the pipe 12 and with the carriage assemblies 14 spaced from pipe 12. FIG. 3 shows the carriage assemblies 14 in the closed forward position with the test plugs threadedly connected to the ends of the pipe and with the carriage assemblies 14 moved forward towards pipe 12 in preparation for testing.

FIG. 1, FIG. 2, and FIG. 3 show the carriage assemblies 14 and illustrate how they function in association with pipe testing apparatus 10. Although there are two carriage assemblies 14 on each pipe testing apparatus 10 only one carriage assembly 14 will be described in detail because the operation and structure of each carriage assembly 14 is substantially the same. The carriage assembly 14 performs two functions. First, carriage assembly 14 through an associated fluid pressure control system (described more fully below) permits test plug 28 to be selectively free floating during initial alignment and stabbing of test plug 28 into the end of pipe 12. This permits test plug 28 to freely compensate for any bend in pipe 12 and to assure proper axial alignment of the test plug 28 and pipe 12 during stabbing and initial rotation. Second, the fluid pressure control system for carriage assembly 14 is designed to detect and indicate any increase or decrease in fluid pressure resulting from any vertical deflection of carriage assembly 14.

Figure 6:
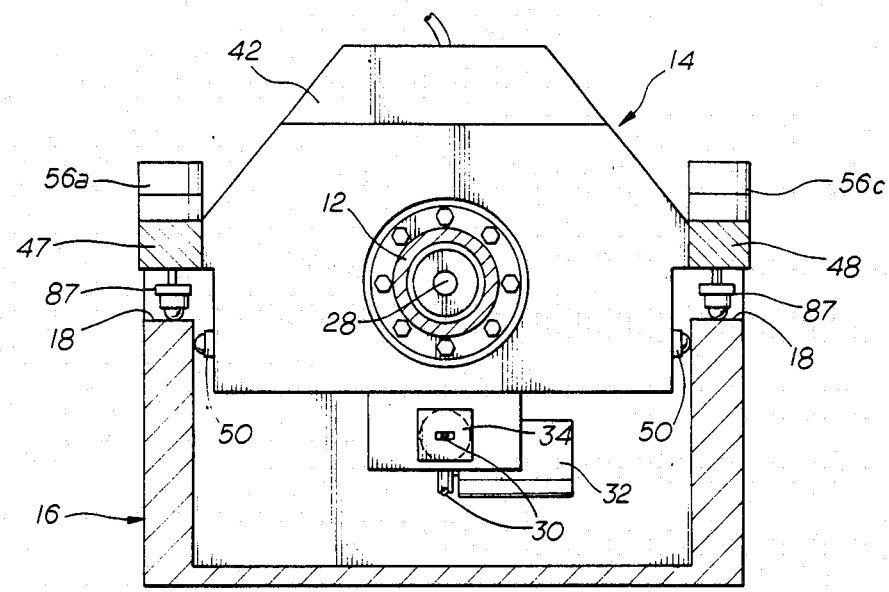
FIG. 6 is a transverse sectional view of the carriage assembly taken on the line 6—6 of FIG. 5.

As shown in FIG. 1, carriage assembly 14 is movably supported on base 16 of pipe testing apparatus 10. Carriage assembly 14 comprises a frame including two parallel support members 47 and 48, which overlie base 16 and which are transversely connected by box-shaped guide 21, housing 42 and brace 52. Test plug 28 is positioned between and attached to the support members 47 and 48. As shown in FIG. 6 and FIG. 7, housing 42 has an end plate 49 carrying spring mounted bearing members 50 engaging base 16 to maintain carriage assembly 14 on base 16. The box-shaped pipe guide 21 carrying two spaced sets of guide rollers 26, 26a, 27, 27a are connected to the front of carriage assembly 14 and support the outer surface of pipe 12 thus allowing test plug 28 to move into alignment with the end of pipe 12.

Four upright fluid pressure cylinders 56a, 56b, 56c, and 56d (sometimes referred to collectively as cylinders 56) are mounted on carriage assembly 14, with one pair of cylinders 56a and 56b mounted on member 47 and with the other pair of cylinders 56c and 56d mounted on member 48. The cylinders 56 permit movement of carriage assembly 14 realtive to base 16, while the associated fluid pressure control system detects and measures any change in fluid pressure in cylinders 56 resulting from a vertical deflection of the associated carriage assembly 14. In the preferred embodiment of the invention, the fluid pressure control system is pneumatically operated. Pneumatic operation provides a very sensitive means for detecting very small changes in pressure due to vertical deflections of the carriage assembly 14. It is understood, however, that other suitable fluids may be employed in the control system. Air hoses or lines 58 positioned along the parallel support members 47 and 48 connect the cylinders 56a, 56b, 56c, and 56d with respective two-way pressure control valves 60a, 60b, 60c, and 60d of the fluid pressure control system.

Figure 8:
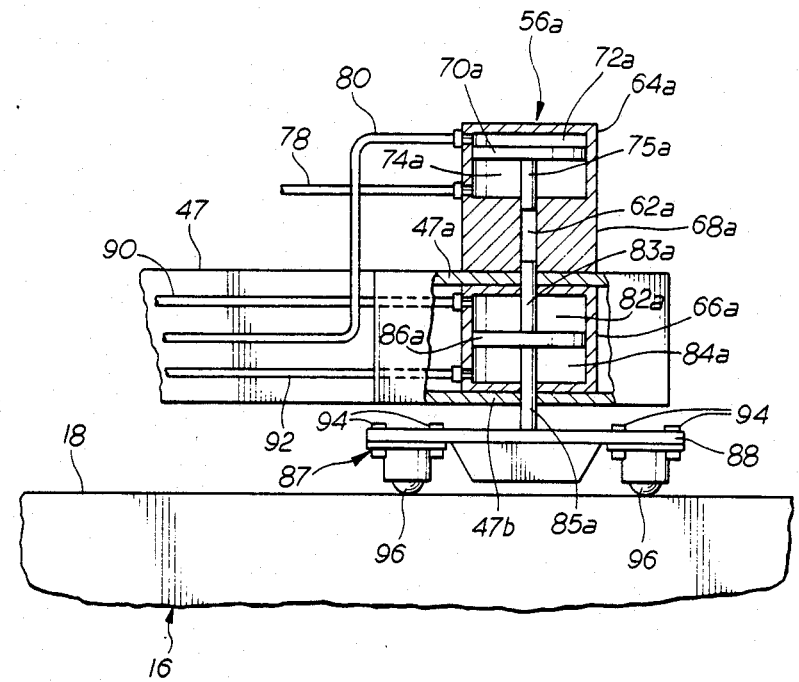
FIG. 8 is a view partly in section and partly in side elevation depicting one of the fluid pressure cylinders mounted on one of the supports of a carriage assembly.

Although there are four cylinders 56a, 56b, 56c, and 56d shown in the preferred embodiment of the invention, they are of the same construction and therefore only cylinder 56a will be described in detail herein, it being understood that cylinders 56b, 56c, and 56d are similar to cylinder 56a. As shown in FIG. 8, cylinder 56a has respective upper and lower sections 64a and 66a secured to opposite sides of web 47a of support member 47 defining upper and lower piston chambers in which the respective pistons 70a and 86a are mounted for reciprocal movement. Lower section 66a is supported on web 47b of support member 47. Upper section 64a has a block or spacer 68a secured to web 47a with an axial bore 62a extending therethrough. Upper piston 70a divides its associated piston chamber into two fluid pressure chambers or areas 72a and 74a. Lower piston 86a divides the associated piston chamber into two fluid pressure chambers 82a and 84a. A piston rod 75a secured to piston 70a is received within the upper end of bore 62a. Fluid pressure chamber 74a is supplied with air from air receiving tank 76 through line 78 while fluid pressure chamber 72a is vented to atmosphere through line 80.

Figure 9:
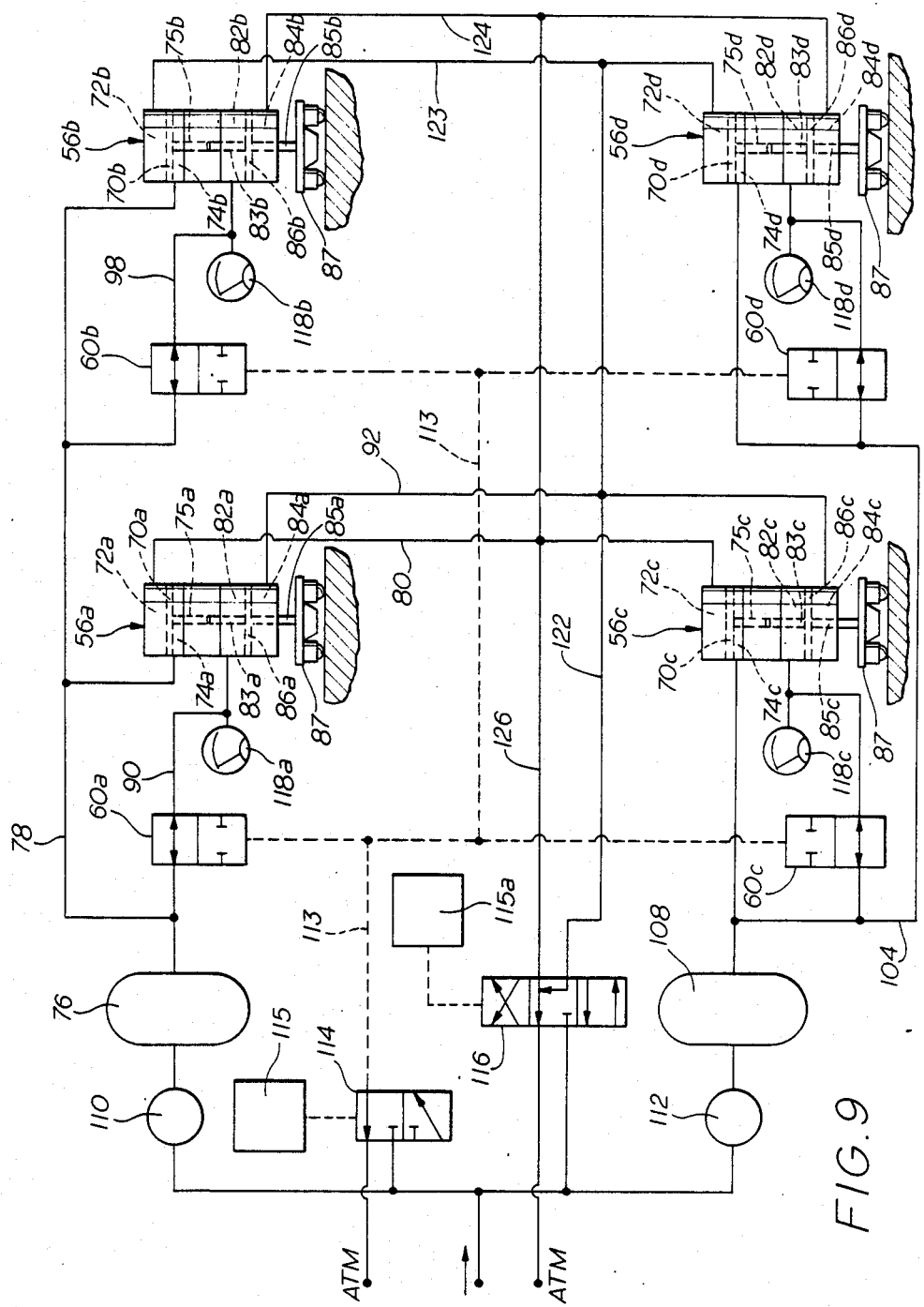
FIG. 9 is a schematic view of the fluid pressure control system of a carriage assembly.

An upper piston rod 83a secured to piston 86a is received within the lower portion of bore 62a. A lower piston rod 85a secured to piston 86a extends downwardly and has a roller support frame, generally indicated by numeral 87, secured to its lower end to support carriage assembly 14 for longitudinal movement along track 18. Fluid pressure chamber 82a is supplied with air from air receiving tank 76 (as shown in FIGS. 9 trough 13) through line 78 and branch line 90. Pressure chamber 84a is vented to atmosphere or selectively supplied with air through line 92.

As shown in FIG. 8, roller support frame 87 comprises a support plate 88 with bolts 94 mounting roller bearings 96 thereon which permit carriage assembly 14 to move in a horizontal direction along track 18 on the base 16 of the pipe testing apparatus 10.

The lower section 66a of cylinder 56a allows the carriage assembly 14 to be free floating because it is the absolute pressure in pressure chamber 82a of the lower section 66a which carries the weight exerted from web 47a of carriage assembly 14. Each cylinder 56 carries a portion of the total weight of carriage assembly 14 because there is a similar pressure chamber in each of the four cylinders. As will be discussed more fully below, variations or changes in fluid pressure in pressure chamber 82a of the lower section 66a result from vertical deflections in the height of carriage assembly 14 relative to base 16. The vertical deflection of carriage assembly 14 relative to base 16 is a result of excessive vertical force created by torque, by misalignment of test plug 28 with the end of pipe 12, by defects in the threads, or by foreign matter in the threads.

Pressure chambers 72a and 84a allow carriage assembly 14 to be repositioned after the test of each pipe 12. Repositioning is necessary because when the end of each pipe 12 is bent carriage assembly 14 must move vertically in order to compensate for the bend, thus moving carriage assembly 14 away from the axial centerline of pipe testing apparatus 10. In order to bring carriage assembly 14 back to the centerline for testing another pipe, carriage assembly 14 must be repositioned.

Referring to FIG. 9, one may see that the preferred embodiment of the control system includes four pneumatically operated cylinders 56a, 56b, 56c, and 56d interconnected by a network of air lines and regulator valves. The cylinders 56a and 56b are connected through lines 78 and 98 to large air receiving tank 76 which supplies air pressure into pressure chambers 74a, 74b, 82a and 82b. The other two cylinders 56c and 56d are also connected through air line 104 to a large air receiving tank 108 which supplies air pressure to pressure chambers 74c, 74d, 82c, and 82d.

Regulator valves 110 and 112 control the absolute pressure supplied to air receiving tanks 76 and 108. The settings of the regulator valves will be dependent upon the static weight which is to be held up or suspended by the four cylinders 56.

Figure 10:
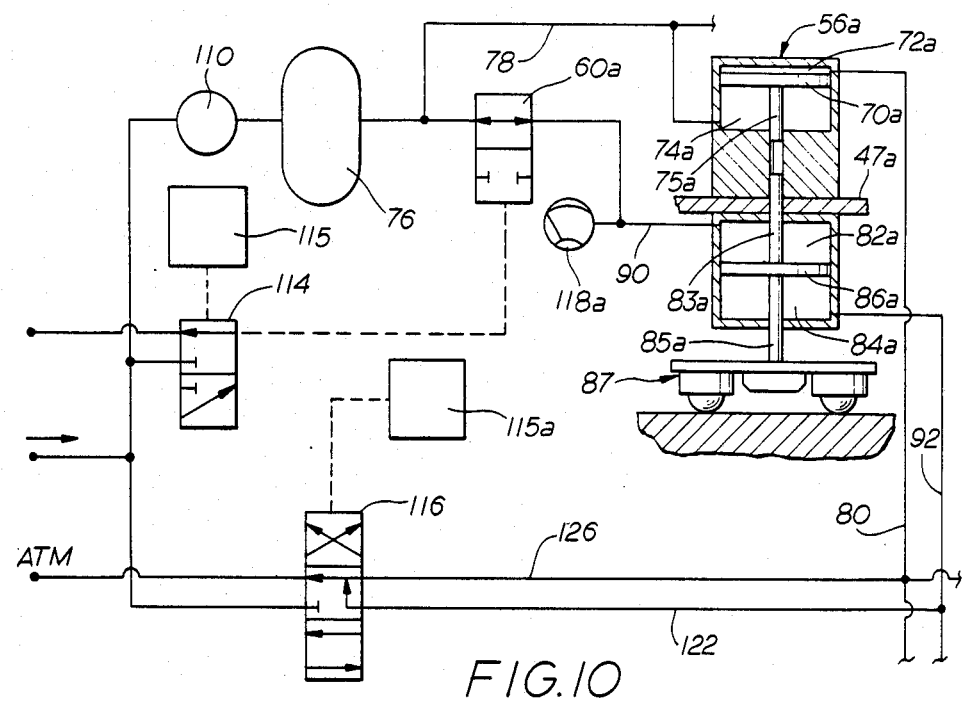
FIG. 10 is a schematic view of one cylinder of a carriage assembly showing the fluid pressure control system in the open float mode.

Two-way pressure control valves 60a and 60b are positioned on branch air lines 90 and 98 between air receiving tank 76 and cylinders 56a and 56b. Two-way pressure control valves 60c and 60d are positioned on air lines 104 and 106 also between air reservoir 108 and cylinders 56c and 56d. These two-way pressure control valves 60a, 60b, 60c and 60d are opened and closed through line 113 by another two-way two position control valve 114 which can be manually or automatically controlled, through control 115. A four-way three position control or repositioning valve 116 located on control 115a controls the air flow into and out of fluid pressure chambers 72a through 72d and 84a through 84d. Controls 115 and 115a normally are positioned on the same panel, which is easily accessible to the operator. When the repositioning valve 116 is open as shown in FIGS. 9 through 11, pressure chambers 72a through 72d and 84a through 84d are open to the atmosphere.

Carriage assembly 14 can function in three modes. Two of the modes, the float mode and the torque mode, are operating modes and are used prior to and during the threading operation and the testing of the pipe. The third mode, the centering mode, is used to recenter carriage assembly 14 after each test.

The positioning of two-way pressure control valves 60a 60b, 60c, and 60d, dictates the operating mode in which carriage assembly 14 will function. When the two-way pressure control valves 60a, 60b, 60c, and 60d are open (as shown in FIG. 9 and FIG. 10), air is supplied to pressure chambers 74a through 74d and 82a through 82d from air receiving tanks 76 and 108, thus creating a zero spring rate in the cylinders 56a, 56b, 56c, and 56d. This zero spring rate permits the cylinders 56 to hold up the entire weight of carriage assembly 14 and allows carriage assembly 14 to be free floating with fluid pressure equilibrium occurring in cylinders 52a through 52d. This operating mode is known as the float mode. The fluid pressure control system is switched into the float mode prior to make-up either during or right after the entry of test plug 28 into the end of pipe 12 so that test plug 28 can float into alignment with the end of pipe 12 and thereby avoid misalignment of the threads which can result in thread damage during the threading operation. The fluid pressure control system may also be switched into the float mode during the make-up cycle.

Figure 11:
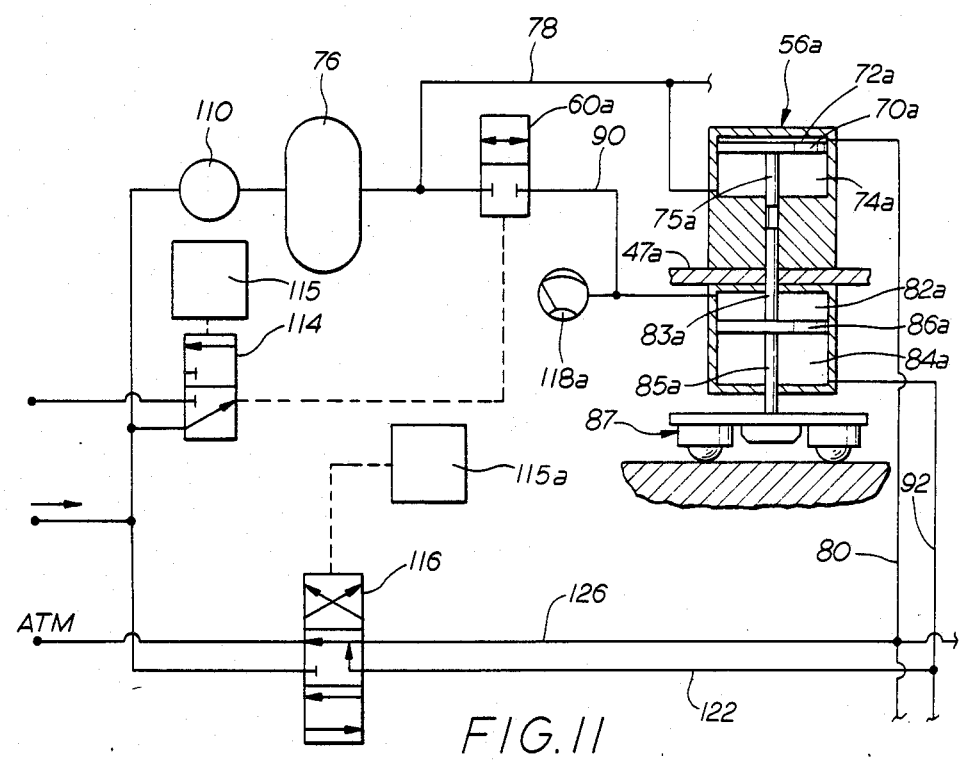
FIG. 11 is a schematic view similar to FIG. 10 but showing the fluid pressure control system in the torque closed mode.
Figure 16:
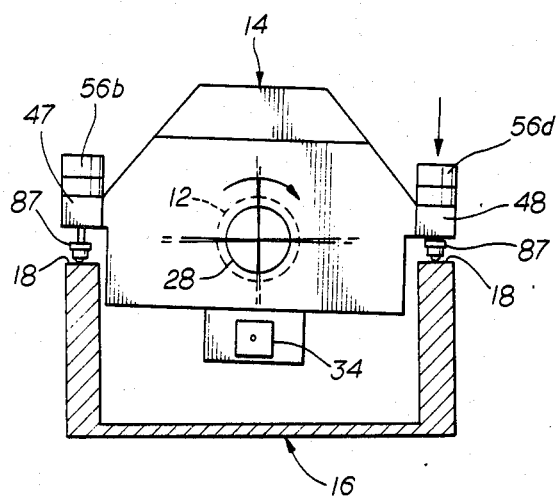

When the two-way valves 60a, 60b, 60c, and 60d are closed (as shown in FIG. 11) air pressure from air receiving tanks 76 and 108 is unable to reach pressure chambers 82a, 82b, 82c, and 82d thus creating a high spring rate in cylinders 56. This operating mode is known as the torque mode. The fluid pressure control system is placed in this mode when test plug 28 is initially being moved towards the end of pipe 12 piror to initial alignment. This is to provide stability and prevent excessive movement and possible damage of carriage assembly 14. The control system is also placed in the torque mode during make-up of the threaded connection and the subsequent testing of the pipe so that excessive vertical forces created during the threading operation can be measured. If during the threading operation or make-up, a vertical force is created, a vertical deflection of carriage assembly 14 occurs as indicated in FIG. 16. This deflection of carriage assembly 14 results in a pressure change within cylinders 56. This pressure change is registered on pressure gauges 118a through 118d, which are monitored by an operator and indicates to the operator that thread damage may be occurring.

The fluid pressure in chamber 82a must be sufficient to support the weight of carriage assembly 14 in both the torque mode and the float mode. In addition, the fluid pressure in chamber 82a should be adequate to provide stability for carriage assembly 14, while permitting free movement in the float mode. Further, the fluid pressure in chamber 82a provides a desired resistance to vertical movement of carriage assembly 14 and a highly sensitive measuring of fluid pressure in chamber 82a in the torque mode. In order to achieve th above objectives, the pressure within chamber 82a should remain constant. As a specific but non-limiting example of the present fluid pressure system, a generally constant pneumatic pressure of eighty pounds per square inch (80 psi) is provided in chamber 82a. To accomplish this, the dimensions of cylinder 56 can be as follows. Chamber 82a of fluid pressure cylinder 56a may have a diameter of three inches (3"), and piston 86a has a one and one-half inch (1½") stroke in either direction from the centered position shown in FIG. 10 and FIG. 11. Piston rods 83a have diameters of one and one-fourth inch (1¼") to provide a total volume in chamber 82a at the maximum stroke of piston 86a of approximately 17.50 cubic inches. In the centered position of piston 86a as shown in FIG. 10 and FIG. 11, chamber 82a has a volume of approximately 8.75 cubic inches.

In order to create a small fluid volume system within cylinder 56a to which guage 118a is highly responsive, valve 60a is placed in the closed position (as shown in FIG. 11). In addition, line 90 is of a relatively short length in order to keep the fluid volume small, and for this purpose valve 60a is attached to carriage assembly 14 adjacent cylinder 56a on web 47a. Thus, in the small volume torque mode as shown in FIG. 11, a very small change in the pneumatic fluid pressure in chamber 82a may be detected and registered on gauge 118a, such as a change as small as one tenth of a pound per square inch (0.10 psi) for example. Futher, any variation in pressure in chamber 82a gives an indication of the actual load or force when excessive torque or misalignment which is being applied between plug 28 and pipe 12. This pressure variation permits an operator to easily monitor these loads during the make-up operation. The small volume system provides cylinder 56a and carriage assembly 14 with a high spring rate.

When the float mode is employed, as shown in FIG. 10, valve 60a is open, including receiving tank 76 within the system. This increases the fluid pressure volume available within the fluid pressure control system and specifically in chamber 82a. For example, air receiving tank 76 which creates this large volume system is a thirty (30) gallon tank of approximately 6900 cubic inches and normally is pressurized at eighty pounds per square inch (80 psi). Such a tank 76 has been found to function effectively in maintaining a constant fluid pressure of around eighty pounds per square inch (80 psi) in fluid pressure chamber 82a. This large fluid volume results in a relatively small spring rate during the float mode which permits carriage assembly 14 to be easily manually moved into a desired position for alignment.

As seen from the above then, in order for cylinders 56 to respond quickly to and compensate for vertical forces on carriage assembly 14 resulting from misalignment of test plug 28 and pipe 12 during the float mode, the fluid pressure in chamber 82a should remain constant. Therefore, chamber 82a should be in fluid communication with air receiving tank 76 so that when an upward force is created by misalignment which causes carriage assembly 14 to move upwardly, fluid flows from air receiving tank 76 into chamber 82a. Similarly, when a downward force is generated so that carriage assembly 14 moves downwardly, fluid flows from chamber 82a into air receiving tank 76 thus equalizing the pressure. While the present expample of the fluid pressure control system in the float mode utilizes a large fluid volume system of approximately eight hundred (800) times the size of the small fluid volume utilized in the torque mode, this system can operate satisfactorily if the large fluid volume system utilized is between approximately 100 and 800 times the volume of the small fluid volume system. Futher, while a pressure of eighty pounds per square inch (80 psi) has been found to be satisfactory in providing a sufficient lift capacity for the weight of carriage assembly 14, and in providing fluid pressure system sensitive to small changes in fluid pressure within chamber 82a, it is apparent that a different fluid pressure could be utilized. For example, the fluid pressure control system for cylinders 56 would operate effectively between approximately twenty pounds per square inch (20 psi) and one hundred and fifty pounds per square inch (150 psi). It being understood that the associated fluid cylinders would be appropriately sized for such fluid pressure and associated carriage. It is, of course, understood that pressure systems having differently pressure ranges might be utilized for different sizes of pipe and different designs of threads as is well known in the art.

Finally, the third mode, which is not an operating mode, is designed to recenter the entire carriage assembly 14 bringing it back to centerline. Recentering is accomplished by again opening two-way pressure control valves 60a, 60b, 60c, and 60d and then opening repositioning valve 116.

Figure 12:
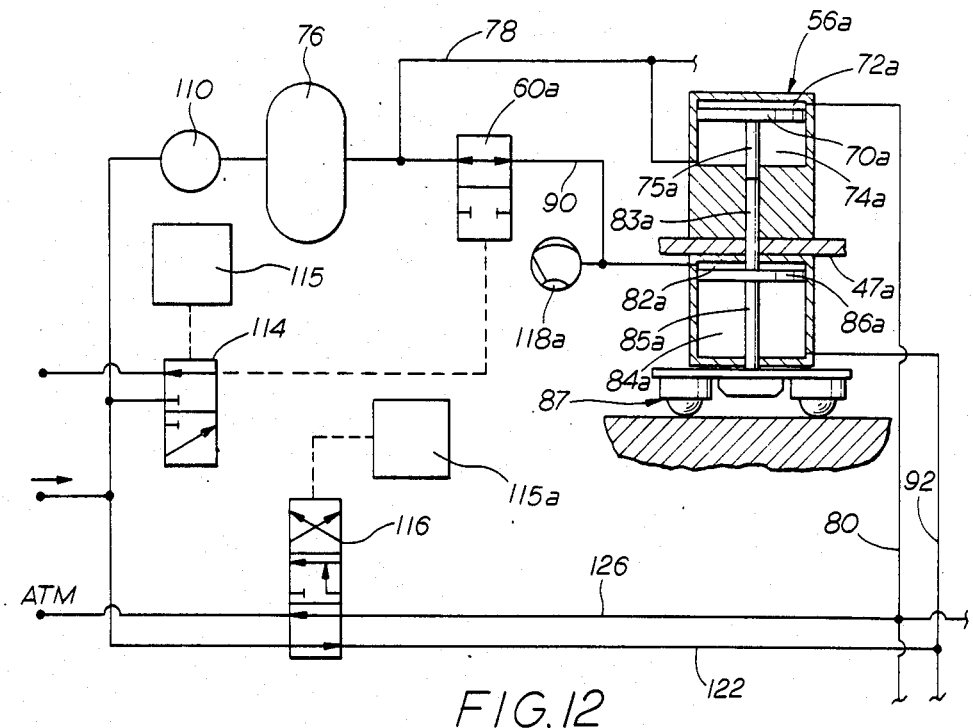
FIG. 12 is a schematic view similar to FIG. 10 but showing the fluid pressure control system in one position prior to return to a centering mode.
Figure 13:
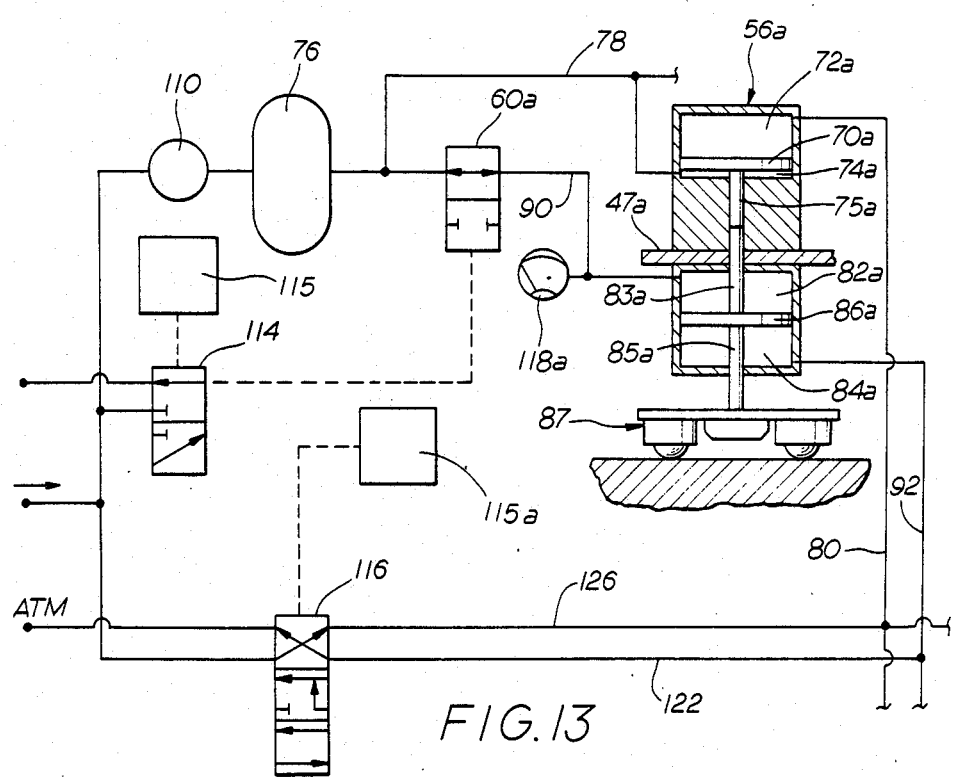
FIG. 13 is a schematic view to FIG. 12 but showing the fluid pressure control system returned to centering mode.

As shown in FIG. 12, the first step of the recentering cycle is to move cylinder 56a to a downward or lowered position by supplying fluid pressure to pressure chamber 84a through line 122. During this step cylinder 56a moves downwardly relative to pistons 86a and 70a thereby forcing the fluid in pressure chamber 82a to flow into pressure chamber 74a or air receiving tank 76 while the fluid in pressure chamber 72a remains open to atmosphere through line 126. Cylinder 56a is now in the desired position for return to the central position as shown in FIG. 13. To move cylinder 56a to the position shown in FIG. 13, repositioning valve 116 is shifted to its top position as shown in FIG. 13. After this step fluid is supplied through line 126 to pressure chamber 72a to lift or raise cylinder 56a and carriage assembly 14 relative to base 16. Fluid in pressure chamber 74a moves to pressure chamber 82a or air receiving tank 76. Fluid in chamber 84a is exhausted to atmosphere through lines 92 and 122. In the final step, repositioning valve 116 is shifted to its center position so that air is exhausted out of pressure chambers 72a and 84a as shown in FIG. 10 and FIG. 11. Piston 70a, by virtue of air pressure from air receiving tank 76 and pressure chamber 74a and the exhaustion of air from pressure chamber 74a, is pushed back up out of the way for the next test. Carriage assembly 14 is now in the correct position to begin another test cycle. The centering is accomplished in part because the stroke of piston 70a is one half that of piston 86a. Further the accurate positioning of piston 70a in its centered position is made possible because piston rod 75a engages the end of piston rod 83a on piston 70a which acts as a stop to position piston 86a in the centered position as shown in FIG. 13.

Because each cylinder 56 (56a, 56b, 56c, and 56d) has an individual pressure control valve 60a, 60b, 60c, and 60d, each cylinder 56 may be operated independently for aligning test plug 28 with pipe 12. Because carriage assembly 14 is supported on roller bearings 96 mounted for free rotation on tracks 18 a limited free lateral movement of carriage 14 on tracks 18 is provided against the bias of bearing members 50 as shown in FIG. 7.

Figure 15:
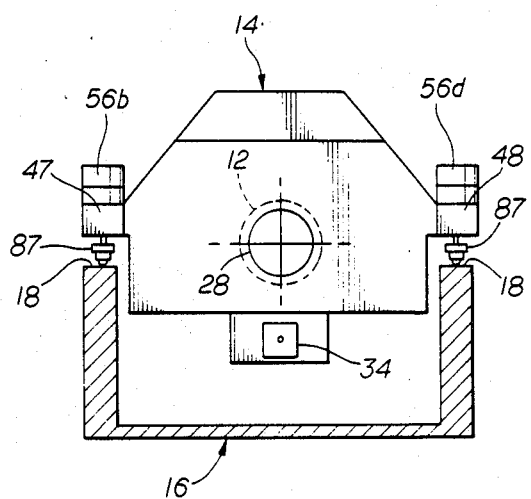

FIG. 14 shows test plug 28 and the end of pipe 2 out of alignment. This misalignment is the sort that would occur if pipe 12 were bent prior to make-up. FIG. 15 shows test plug 28 and pipe 12 in perfect alignment. FIG. 16 shows test plug 28 and pipe 12 during the threading operation. The threaded connection isexperiencing torque which is being translated into a downward force on cylinders 56c and 56d and is being translated into an upward force on cylinders 56a and 56b. This force will be measured as an increase in fluid pressure within cylinders 56c and 56d, and a decrease in fluid pressure in cylinders 56a and 56b.

In operation, a length of pipe 12 is moved or rolled laterally either by hand or by other suitable means onto supporting rollers 22 and 24 of base 16 with carriage assembly 14 positioned as shown in of FIG. 2. Then carriage assembly 14 is moved longitudinally with rollers 26, 26a, 27, and 27a contacting pipe 12 and initially aligning the end of pipe 12 with test plug 28. The fluid pressure control system is initially placed in the torque mode when test plug 28 is being moved into contact with the end of pipe 12 for stability of carriage assembly 14. After contact, the fluid control system is switched into the float mode for initial alignment between pipe 12 and test plug 28 prior to make-up of the connection or joint, with cylinders 56a through 56d in the position shown in FIG. 10.

After the stabbing of test plug 28 into pipe 12 and the equalizing of fluid pressure in cylinders 56a through 56d, two-way pressure control valves 60a through 60d are actuated to provide a small fluid volume for the closed torque mode. Then, test plug 28 is rotated by actuation of hydraulic motor 36 to make up the connection or joint. In this mode, if pipe 12 and test plug 28 are misaligned or other resistance to the threading operation occurs, (such as cross-threading, side loading, or foreign matter in the threads), an increase or decrease in associated fluid pressure will occur in pressure chambers 82a through 82d of cylinders 56a through 56d as a result of the vertical deflection of carriage assembly 14 relative to base 16. This change in fluid pressure in pressure chambers 82a through 82d will be instantly communicated to pressure monitors or gauges 118a through 118d which are constantly being monitored by an operator. If the rotational force or torque results in such a vertical deflection of carriage assembly 14 as to effect an excessive fluid pressure in any of the cylinders 82a through 82d, then the threading operation may be stopped to prevent damage to the joint and to determine the reason for the increasing or excessive torque. It the test plug 28 is misaligned with pipe 12 during the make-up, an operator may stop the make-up process and move the pressure control system back into the float mode so that carriage assembly 14 can be freely movable in order to correct the misalignment before returning to the make-up operation. Thus, the fluid control system of the invention permits the correction of any misalignment and the immediate detection of any excessive fluid pressure in the cylinders supporting the carriage assembly 14 resulting from excessive torque or the like during make-up thereby minimizing damage occurring to the threaded connection.

Although the invention has been described in terms of specified embodiments which are set forth in detail, it is understood that this is for illustration only and that the invention is not necessarily limited therto, since alternative embodiments and operating techniques or methods may become apparent to those skilled in the art in view of the disclosure. Accordingly, modifications are contemplated which can be made without departing from the spirit of the described invention.

What is claimed is:

1. An apparatus for initially aligning a threaded test plug and a threaded tubular pipe prior to make-up of the connection to each other and for the immediate detection of any excessive vertical force resulting from make-up comprising:
   a base on which the tubular pipe is supported for generally horizontal movement;
   a carriage assembly mounted on said base and supporting the test plug for movement therewith;
   means mounting said carriage assembly on said base for movement in a generally horizontal direction relative to said base;
   opposed pairs of fluid pressure cylinders on opposed sides of said carriage assembly mounting said carriage assembly for movement in a generally vertical direction relative to said base;
   means to rotate the test plug relative to the tubular pipe to connect the test plug and tubular pipe in threaded relation during make-up;
   means for detecting immediately any vertical deflection of said carriage assembly resulting from excessive vertical force thereon created during the make-up of the threaded members, said means for detecting said vertical deflection including a fluid pressure system associated with said fluid pressure cylinders for operation thereof and means for indicating changes in fluid pressure in said fluid pressure cylinders upon said vertical deflection; and
   control means associated with said fluid pressure system and said fluid pressure cylinders responsive to initial contact between said test plug and said tubular pipe for moving said carriage and test plug into axial alignment with said tubular pipe.

2. An apparatus as claimed in claim 1 wherein said fluid pressure system includes means permitting each fluid pressure cylinder to be operated independently of the other fluid pressure cylinders.

3. An apparatus as claimed in claim 1 wherein said means mounting said carriage assembly on said base for movement in a longitudinal direction relative to said base, comprises a fluid motor, and a flexible driving connection between the fluid motor and carriage assembly for moving the carriage assembly selectively in a longitudinal direction relative to the base.

4. An apparatus for accurately aligning a threaded test pipe with a threaded pipe for connection to each other and for the immediate detection of any excessive vertical force resulting from make-up, comprising:
   a base on which the pipe is supported;
   a carriage assembly mounted on said base supporting the test plug for movement therewith;
   opposed pairs of fluid pressure cylinders on opposed sides of said carriage assembly for supporting said carriage assembly on said base for relative vertical movement;
   means mounting said carriage assembly and test plug on said base for movement in a generally horizontal direction relative to said base and pipe;
   fluid pressure control means associated with said fluid pressure cylinders for effecting movement of said carriage assembly into a desired position for initial axial alignment of said pipe and test plug prior to make-up; and
   means on the carriage assembly to rotate the test plug relative to the pipe to thread the test plug onto the pipe during make-up;
   said fluid pressure control means including separate monitoring means for each of said fluid pressure cylinders for immediately indicating a change in fluid pressure in selected fluid pressure cylinders resulting from any excessive vertical force created during the make-up of the test plug and pipe.

5. An apparatus as claimed in claim 4 wherein said base has lower guide rollers supporting said pipe, and said carriage assembly has upper and lower guide rollers thereon in contact with the outer surface of said pipe, said guide rollers moving with said carriage assembly to effect axial alignment of the adjacent end of the pipe with the test plug.

6. An apparatus as claimed in claim 4 wherein each of said fluid pressure cylinders has a piston chamber with a piston therein and a piston rod extending downwardly from said piston; and
   a roller support on the extending end of the piston rod engaging the base for longitudinal movement along the base.

7. An apparatus as claimed in claim 6 wherein a fluid monitor is in fluid communication with the piston chamber of each cylinder to indicate immediately any change in fluid pressure in any of the cylinders during make-up of the connection.

8. An apparatus as claimed in claim 4 wherein said carriage assembly has a pair of parallel support members mounted over a pair of aligned tracks on said base;
   said fluid pressure means including a pair of fluid pressure cylinders on each support member between the associated support member and track for supporting the carriage assembly on the track, each fluid pressure cylinder having an anti-friction support on its lower end engaging the associated track for longitudinal movement along the track.

9. An apparatus as claimed in claim 8 wherein said fluid pressure control means associated with said fluid pressure cylinders permit selected raising and lowering of each fluid pressure cylinder relative to said base thereby to raise and lower said carriage assembly on said base for axial alignment of said test plug and said pipe.

10. An apparatus as claimed in claim 8 wherein each of said fluid pressure cylinders is secured to an associated support member and has a piston chamber with a double acting piston therein;

said fluid pressure control means supplying fluid to one side of said piston for raising carriage assembly and supplying fluid to the other side of said piston for lowering said carriage assembly.

11. As a sub-combination in a pipe testing apparatus, a control system for controlling the position of a test plug with respect to a pipe, including:

a movable carriage assembly having a threaded test plug attached thereto;

a base supporting the carriage assembly and having the end portion of a threaded pipe supported on said base with the end of the pipe spaced from the test plug and in approximate axial alignment therewith;

a plurality of separate fluid pressure members associated with and supporting the carriage assembly and test plug on the base;

means for operating the separate fluid pressure members to place the carriage assembly and test plug in either a free floating position or in a force measuring position;

the movement of the carriage assembly while in a free floating position functioning to move the test plug into initial contact with th end portion of the pipe whereby the usual tapered lead-in surfaces of the threaded portions of the pipe and test plug will axially align the test plug with the pipe as the threads thereof engage each other;

the rotation of the test plug relative to the pipe while the carriage assembly and test plug are in the force measuring position functioning to threadedly connect the plug to the pipe and to measure vertical forces created during the threading operation; and monitoring means responsive to the fluid pressure in said pressure members for indicating said vertical forces.

12. The sub-combination as claimed in claim 11, wherein said pressure-actuated means associated with and supporting the carriage assembly is pneumatic.

13. The sub-combination as claimed in claim 12, wherein said pressure-actuated means associated with and supporting the carriage assembly includes;

a plurality of cylinders attached to the movable carriage assembly;

each cylinder having at least one piston therein, and means supporting the piston on an immovable base, whereby pressure applied to the pistons within the cylinders causes movement of the cylinders and the carriage assembly to which the cylinders are attached.

14. The sub-combination as claimed in claim 13 including, a pneumatic pressure system which includes the pistons and the fluid pressure cylinders;

an air receiving tank;

air lines connecting the air receiving tank and pistons;

control valves in said lines for controlling flow of pressure fluid to the cylinders and throughout said pressure systems; and a pressure guage in at least one of the air lines which indicates the vertical force which occurs during make-up of the threaded connection between the test plug and pipe.

15. A carriage assembly for mounting on a base for movement therealong and for aligning axially a threaded test plug with a generally horizontally extending pipe;

said carriage assembly comprising a generally rectangular frame having a fluid pressure cylinder adjacent each corner thereof, each cylinder having a lower piston chamber and a vertically movable lower piston in the piston chamber forming upper and lower fluid chambers;

said piston having a piston rod extending from opposite sides thereof to form a double acting piston having upper and lower piston rods;

said lower piston rod having a support on its extending end to support said carriage assembly for vertical movement;

said upper piston rod acting to limit the stroke of said piston to a predetermined intermediate piston position; and means on said frame supporting a test plug for rotation and subsequent make-up of the test plug and pipe.

16. A carriage assembly as claimed in claim 15 wherein a guide adjacent an end of the pipe includes pairs of upper and lower rollers to support said pipe end.

17. A carriage assembly as claimed in claim 15 wherein said cylinder includes an upper piston chamber above said first mentioned lower piston chamber and having a piston therein with a downwardly extending piston rod thereon;

a spacer separating said upper and lower piston chambers and having an axial bore therethrough;

both said piston rods on said upper piston and said under piston rod on said first mentioned lower piston being received in said axial bore;

said piston rods received in said bore being of a length to contact each other in an intermediate position of said lower piston when said upper piston is at the lower end of its stroke thereby limiting movement of said lower piston when the fluid pressure against said upper piston is greater than the fluid pressure against the lower piston.

18. A method for initially aligning two threaded tubular members prior to threaded make-up and for immediately detecting through a change in fluid pressure any excessive vertical force resulting from make-up of the threaded connection, comprising the steps of:

supporting one of the tubular members on a fixed base;

supporting the other of the tubular members on a carriage assembly movable in a generally horizontal direction along the base for moving said other tubular member axially relative to said one tubular member;

suspending said carriage assembly and other tubular member in a floating fluid system having fluid pressure cylinders mounted between the carriage and base, the fluid system being a free floating system open to a fluid receiving tank during initial alignment of the tubular members prior to make-up;

then changing the fluid suspension of said carriage assembly and other tubular member to a fluid system closed to the fluid receiving tank after said initial alignment to permit any change in the fluid pressure of the fluid pressure cylinders to be indicated immediately;

thereafter rotating said other tubular member during make-up to connect it to said one tubular member; and monitoring immediately any change in fluid pressure in the fluid pressure cylinders resulting from any excessive vertical force created during make-up of the connection.

19. A method of testing the threaded joint between a pipe and a test plug, comprising the steps of:

supporting a pipe having a threaded end on a fixed support base;

supporting a test plug having threads upon a movable carriage assembly which may be in either a free floating condition or a force measuring condition;

placing said carriage assembly into a free floating condition;

moving said carriage assembly while in said free floating condition into initial contact with the end portion of the pipe, whereby the usual tapered lead-in surfaces of the threaded portions of the pipe and test plug axially aligns the test plug with the pipe as the threads of the plug and pipe engage;

placing said carriage assembly into a force measuring condition;

rotating the test plug to threadedly connect the plug and pipe end; and measuring the torque as the threaded connection between the test plug and pipe is progressing, whereby the threading operation may be discontinued if excessive torque occurs, which may damage the threads.

20. A method for initially aligning two threaded tubular members prior to threaded make-up and for detecting misalignment through changes in fluid pressure, comprising the steps of:

supporting one of the tubular members on a fixed base;

supporting the other of the tubular members on a carriage assembly for moving said other tubular member axially relative to said one tubular member;

initially supporting said carriage assembly and other tubular member in a fluid system between the carriage and base having fluid pressure cylinders mounted between the carriage and base, the fluid system being closed to a fluid receiving tank during initial movement of the tubular members toward each other generally prior to contact between the members;

then changing the fluid support of said carriage assembly and other tubular member to a free floating system open to a fluid receiving tank for contact between the tubular members to permit said tubular member to align axially in a balanced free floating fluid pressure system; and monitoring immediately any changes in fluid pressure in the cylinders resulting from contact of the misaligned members during alignment.

21. A method for initially aligning two threaded tubular members prior to threaded make-up and for immediately detecting through an increase in fluid pressure any excessive torque resulting from make-up of the threaded connection, comprising the steps of:

supporting one of the tubular members on a fixed base;

supporting the other of the tubular members on a carriage assembly movable in a generally horizontal direction along the base for moving said other tubular member axially relative to said one tubular member;

supporting said carriage assembly and other tubular member in a floating fluid system having fluid pressure cylinders mounted between the carriage and base, the fluid system being a free floating system open to a fluid receiving tank during initial alignment of the tubular members prior to make-up;

then changing the fluid support of said carriage assembly and other tubular member to a fluid system closed to the fluid receiving tank after said initial alignment to permit any increase in the fluid pressure of the cylinders to be indicated immediately;

thereafter rotating said other tubular member during make-up to connect it to said one tubular member;

monitoring immediately any increase in fluid pressure in the fluid pressure cylinders resulting from an increase in torque during make-up of the connection;

discontinuing make-up of the connection after detecting any increase or decrease in fluid pressure in the fluid pressure cylinders;

then again changing the fluid support of said carriage assembly to said free floating system to permit realignment of said tubular members while said members are connected;

then changing the fluid support of said carriage assembly to a fluid system closed to the fluid receiving tank; and then continuing make-up of the connection.

22. A method for correcting axial misalignment of a threaded test plug with a threaded tubular member during make-up of the connection while the test plug is mounted for rotation on a carriage assembly supported by a fluid pressure means, comprising the steps of:

supporting said carriage assembly and test plug in a closed small volume fluid system having fluid pressure cylinders supporting the carriage assembly for vertical movement;

thereafter rotating said test plug to threadedly connect it to said tubular member;

monitoring immediately any change in fluid pressure in said fluid pressure cylinders resulting from any excessive vertical force created by misalignment during make-up of the threaded connection;

ceasing rotation of the test plug after detecting a change in fluid pressure in said fluid pressure cylinders;

then supporting said carriage assembly and said test plug in a free floating fluid large volume system to permit the test plug to move freely and realign with the tubular member;

then again supporting said carriage assembly and said test plug in a closed small volume fluid system after realigning said carriage assembly; and then commencing rotation of the test plug to continue the threading operation.

* * * * *

UNITED STATES PATENT AND TRADEMARK OFFICE
CERTIFICATE OF CORRECTION

PATENT NO. : 4,667,389
DATED : May 26, 1987
INVENTOR(S) : Brian B. Hasha

It is certified that error appears in the above—identified patent and that said Letters Patent is hereby corrected as shown below:

Column 2, line 25, letters "fo" should be -- of --

Column 2, line 68, the word -- with -- should be inserted before the word "the" whereby that portion of the sentence reads -- aligne with the pipe end --

Column 3, line 21, the word "tow" should be changed to -- two --

Column 3, line 30, the word "and" should be changed to -- any --

Column 3, line 40, the word -- fluid -- should be inserted in front of the word "control" whereby that portion of the sentence reads -- permits the fluid control system --

Column 8, line 12, the word "piror" should be changed to -- prior --

Column 8, line 36, the letters "th" should be changed to -- the --

UNITED STATES PATENT AND TRADEMARK OFFICE
CERTIFICATE OF CORRECTION

PATENT NO. : 4,667,389

DATED : May 26, 1987

INVENTOR(S) : Brian B. Hasha

It is certified that error appears in the above-identified patent and that said Letters Patent is hereby corrected as shown below:

Column 10, line 41, a space should be inserted between the letters "is" and "experiencing" whereby there are two words which read -- is experiencing --.

Signed and Sealed this

Thirty-first Day of May, 1988

Attest:

DONALD J. QUIGG

*Attesting Officer*  *Commissioner of Patents and Trademarks*